(12) United States Patent
Shi et al.

(10) Patent No.: US 11,368,506 B2
(45) Date of Patent: Jun. 21, 2022

(54) FAULT HANDLING FOR COMPUTER NODES IN STREAM COMPUTING SYSTEM

(71) Applicant: BEIJING BAIDU NETCOM SCIENCE AND TECHNOLOGY CO., LTD., Beijing (CN)

(72) Inventors: Ran Shi, Beijing (CN); Yi Cheng, Beijing (CN); Jianwei Zhang, Beijing (CN); Weikang Gao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 366 days.

(21) Appl. No.: 15/873,744

(22) Filed: Jan. 17, 2018

(65) Prior Publication Data

US 2018/0205776 A1 Jul. 19, 2018

(30) Foreign Application Priority Data

Jan. 17, 2017 (CN) .......................... 201710035881.4

(51) Int. Cl.
*H04L 29/06* (2006.01)
*G06F 11/14* (2006.01)
*H04L 65/60* (2022.01)
*G06F 11/07* (2006.01)
(Continued)

(52) U.S. Cl.
CPC .......... *H04L 65/60* (2013.01); *G06F 11/0709* (2013.01); *G06F 11/0793* (2013.01);
(Continued)

(58) Field of Classification Search
CPC ............. G06F 2201/84; G06F 11/1471; G06F 11/1446; G06F 11/1402; G06F 11/1448;
(Continued)

(56) References Cited

U.S. PATENT DOCUMENTS

2003/0074600 A1* 4/2003 Tamatsu .............. G06F 11/1458
714/5.11
2012/0117421 A1* 5/2012 Craft ................... G06F 11/1469
714/15
(Continued)

FOREIGN PATENT DOCUMENTS

CN 102546247 A 7/2012
CN 102904919 A 1/2013
(Continued)

*Primary Examiner* — Tom Y Chang
(74) *Attorney, Agent, or Firm* — Marshall, Gerstein & Borun LLP

(57) ABSTRACT

The objective of the present invention is to provide a method, apparatus, computing node and computer program product for fault handling in a stream computing system. Here, at a computing node, recording arrival sequences of respective original data from a upstream computing node; performing persistence operation on the respective original data according to a predetermined period; in the case of failure and restart, restoring to-be-computed data in internal storage from the original data subjected to the persistent operation and/or the upstream computing node, and replaying and computing the restored to-be-computed data according to the respective previous arrival sequences; continuing encoding each completely computed result data according to offset of the result data in the last persistent operation period before the failure and transmitting the encoded result data to a next node.

13 Claims, 2 Drawing Sheets

(51) Int. Cl.
*H04L 69/40* (2022.01)
*H04L 67/1097* (2022.01)

(52) U.S. Cl.
CPC ...... *G06F 11/1407* (2013.01); *G06F 11/1438* (2013.01); *G06F 11/1471* (2013.01); *H04L 69/40* (2013.01); *G06F 2201/84* (2013.01); *H04L 67/1097* (2013.01)

(58) Field of Classification Search
CPC . G06F 11/1469; G06F 16/24568; G06F 9/542
See application file for complete search history.

(56) References Cited

U.S. PATENT DOCUMENTS

| | | | |
|---|---|---|---|
| 2014/0006465 A1* | 1/2014 | Davis | G06F 16/183 707/827 |
| 2014/0304545 A1* | 10/2014 | Chen | G06F 11/1438 714/4.3 |
| 2016/0335287 A1* | 11/2016 | Li | G06F 16/24568 |
| 2016/0342485 A1* | 11/2016 | McHugh | G06Q 30/0241 |
| 2017/0083579 A1* | 3/2017 | Du | G06F 16/182 |
| 2017/0116089 A1* | 4/2017 | Park | G06F 11/1471 |
| 2017/0177442 A1* | 6/2017 | Han | G06F 11/1471 |

FOREIGN PATENT DOCUMENTS

| | | |
|---|---|---|
| CN | 104252466 A | 12/2014 |
| CN | 104813276 A | 7/2015 |
| CN | 105871603 A | 8/2016 |
| CN | 105959151 A | 9/2016 |

\* cited by examiner

FAULT HANDLING FOR COMPUTER NODES IN STREAM COMPUTING SYSTEM

CROSS-REFERENCE TO RELATED APPLICATION

This application is related to and claims the priority from Chinese Application No. 201710035881.4, filed on Jan. 17, 2017, entitled "Fault Handling for Computer Nodes in Stream Computing System," the entire disclosure of which is incorporated herein by reference.

FIELD OF THE INVENTION

The present invention relates to the technical field of stream computing, and more specifically to a fault handling technology in a stream computing system.

BACKGROUND OF THE INVENTION

Currently, a common stream computing system provides computation results to the transmission system in three optional semantics:
1) at most once: this guarantees that after a computation result encounters a node fault during a computation process, the computation result is transmitted to the transmission system at most once before and after the computation is recovered.
2) at least once: this guarantees that after a computation result encounters a node fault during a computation process, the computation result is transmitted to the transmission system at least once before and after the computation is recovered. For example, Strom.
3) exactly once: storage supports functions like update power depends on release of the computation result, and a key on which the update is based is generally designated by a traffic side, which implements directly recording the computation result into storage, not supporting continuing the stream computation for the result. For example, FLink uses Cassandra as storage.

At most once or at least once is only an implementation guarantee of a certain aspect of exactly once. During use, the user can only select no-duplicate or no-loss to compromise the traffic computation demands. The limited exactly once semantics supports releasing a computation result to a storage function like update power, but does not support the subsequent computation result to continue a complex app concatenation and other traffic scenarios such as stream computation and analysis.

However, in many fields, e.g., finance, charging, anti-cheating, advertisement, the traffic scenarios naturally demand no-duplicate and no-loss of data from computation to transmission, to satisfy the accurate demand of data integrity, meanwhile with complex computing scenarios, the demand cannot be satisfied by simply saving the computation result into the storage like update power. To this end, the user needs to add additional complex data replay and verification deduplication logic to the traffic layer so as to guarantee no-duplicate and no-loss of the data computation result. However, this scheme is highly demanding on the user and extremely prone to problems such as data inconsistency, which increases the user's development cost. Moreover, this solution cannot be multiplexed between users, such that a universal logic on the stream computation frame layer cannot be formed.

SUMMARY OF INVENTION

The objective of the present invention is to provide a method, apparatus, computing node and computer program product for fault handling in a stream computing system.

According to one aspect of the present invention, a method for fault handling in a stream computing system is provided, wherein at a computing node, the method comprises the following steps:
recording arrival sequences of respective original data from a upstream computing node;
performing persistence operation on the respective original data according to a predetermined period;
in the case of failure and restart, restoring to-be-computed data in internal storage from the original data subjected to the persistent operation and/or the upstream computing node, and replaying and computing the restored to-be-computed data according to the respective previous arrival sequences; and
continuing encoding each completely computed result data according to offset of the result data in the last persistent operation period before the failure and transmitting the encoded result data to a next node.

According to one aspect of the present invention, an apparatus for fault handling in a stream computing system is provided, wherein the apparatus is arranged at a computing node of the stream computing system, the apparatus comprises:
a module for recording arrival sequences of respective original data from a upstream computing node;
a module for performing persistence operation on the respective original data according to a predetermined period;
a module for in the case of failure and restart, restoring to-be-computed data in internal storage from the original data subjected to the persistent operation and/or the upstream computing node, and replaying and computing the restored to-be-computed data according to the respective previous arrival sequences; and
a module for continuing encoding each completely computed result data according to offset of the result data in the last persistent operation period before the failure and transmitting the encoded result data to a next node.

According to one aspect of the present invention, a computing node in a stream computing system is provided, wherein the computing node comprises the apparatus for fault handling in a stream computing system according to any one of claims 6 to 10.

According to one aspect of the present invention, a computing node in a stream computing system is provided, wherein the computing node comprises storage and processor, wherein the storage stores computer program code, when the computer program code executed by the processor, the method for fault handling in a stream computing system according to any one of claims 1 to 5 is being performed.

According to one aspect of the present invention, a computer program product is provided, the computer program product can be executed in a computing node of a stream computing system, when the computer program product is being executed, the method for fault handling in a stream computing system according to any one of claims 1 to 5 is being performed.

Compared with the prior art, the present invention provides a fault-tolerant mechanism without duplication and loss of the stream computation output result implemented on a frame layer, and through the periodical checkpoint mechanism of the stream computing system, deduplication at a downstream node according to a release offset, and a "data sequential replaying" mechanism, various software and hardware faults may be handled and high accuracy of the output result may be guaranteed. The present invention may be widely applied to fields that strictly require no-deduplication and no-loss for stream computation, e.g., advertisement, finance, anti-cheat, etc.

Implementation of the stream computation frame is transparent to the user, i.e., by using the present invention, high accuracy of the computation result may be guaranteed without extra need of development or operation by the user.

The present invention may guarantee the exactly once semantics of the data computation result without adding extra complex data replay or check logic at the traffic layer code by the user, which reduces the complexity of user program development, enhances data accuracy, and extends the application scenarios of stream computation.

BRIEF DESCRIPTION OF THE ACCOMPANYING DRAWINGS

Other features, objectives, and advantages of the present invention will become more apparent through reading the detailed depiction of the non-limiting embodiments with reference to the accompanying drawings.

In the drawings, the same or similar reference numerals represent the same or similar components.

EMBODIMENT OF INVENTION

Figure 1:
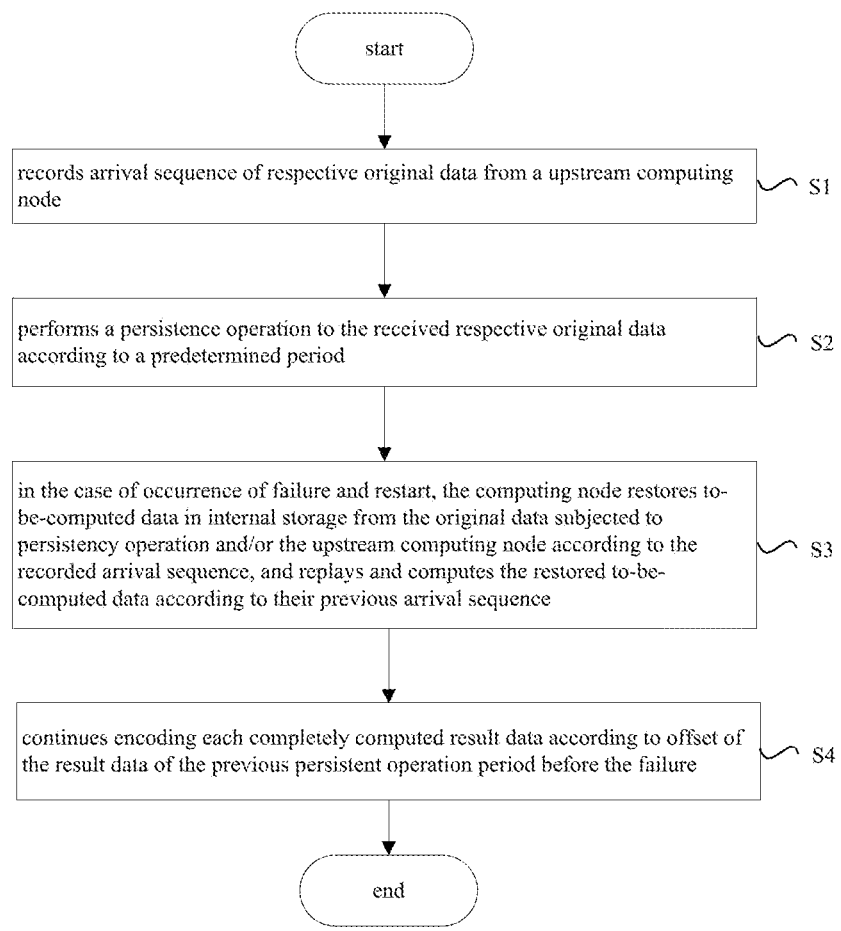
FIG. 1 shows a flow diagram of a fault handling method for a stream computing system according to an embodiment of the present invention.

Before discussing the exemplary embodiments in more details, it should be noted that some exemplary embodiments are described as processes or methods depicted as flow diagrams. Although the flow diagrams describe various operations as sequential processing, many operations therein may be implemented in parallel, concurrently or simultaneously. Besides, the sequence of various operations may be re-arranged. When the operations are completed, the processing may be terminated; besides, there may also include additional steps that are not included in the drawings. The processing may correspond to a method, a function, a specification, a sub-routine, a sub-program, etc.

The "computer device" herein (also referred to as "the computer") refers to a smart electronic device that may execute a predetermined processing process such as numerical computation and/or logic computation by running a predetermined program or instruction, which may comprise a processor and a memory, wherein the processor executes a program instruction prestored in the memory to execute the predetermined processing process, or executes the predetermined processing process using hardware such as ASIC, FPGA, and DSP, or executes by the combination of the two above. The computer device includes, but not limited to, a server, a personal computer (PC), a laptop computer, a tablet computer, a smart phone, and etc.

The computer device for example includes a user equipment and a network device. Particularly, the user equipment includes, but not limited to, a personal computer (PC), a laptop computer, and a mobile terminal, etc.; the mobile terminal includes, but not limited to, a smart phone, a PDA, and etc.; the network device includes, but not limited to, a single network server, a server group consisting of a plurality of network servers, or a cloud consisting a large number of computers or network servers based on cloud computing, wherein the cloud computing is a kind of distributed computing, i.e., a hypervisor consisting of a group of loosely coupled computer sets. Particularly, the computer device may operate to implement the present invention individually or may access to a network to implement the present invention through an interactive operation with other computer devices in the network. Particularly, the network where the computer device is located includes, but not limited to, the Internet, a Wide Area Network, a Metropolitan Area Network, a Local Area Network, a VPN network, etc.

It needs to be noted that the user equipment, network device, and network here are only examples, and other existing or future possibly emerging computer devices or networks, if applicable to the present invention, but also may be included within the protection scope of the present invention, which are incorporated here by reference.

The methods that will be discussed infra (some of which will be illustrated through flow diagrams) may be implemented through hardware, software, firmware, middleware, microcode, hardware descriptive language or any combination thereof. When they are implemented using software, firmware, middleware or microcode, the program codes or code segments for implementing essential tasks may be stored in a computer or computer readable medium (e.g., storage medium). (One or more) processors may implement essential tasks.

The specific structures and functional details disclosed here are only representative and intended to describe the exemplary embodiments of the present invention. Further, the present invention may be specifically implemented by a plurality of alternative modes and should not be construed to being only limited to the embodiments illustrated herein.

It should be understood that although terms like "first" and "second" may be used here to describe respective units, these units should not be limited by these terms. Use of these terms are only for distinguishing one unit from another unit. For example, without departing from the scope of exemplary embodiments, a first unit may be referred to as a second unit, and likewise the second unit may be referred to as the first unit. The term "and/or" used here includes any and all combinations of one or more associated items as listed.

The term used here is only for describing preferred embodiments, not intended to limit the exemplary embodiments. Unless otherwise indicated, a singular form "a(n)" or "one" used here is also intended to cover plurality. It should also be understood that the terms "comprise" and/or "include" as used here limit the presence of features, integers, steps, operations, units and/or components as stated, but do not exclude presence or addition of one or more other features, integers, steps, operations, units, components and/or combinations.

It should also be mentioned that in some alternative implementations, the functions/actions as mentioned may occur according to the sequences different from what are indicated in the drawings. For example, dependent on the functions/actions as involved, two successively indicated diagrams actually may be executed substantially simultaneously or sometimes may be executed in a reverse order.

The present invention is applied to a stream computation system. The stream computation system is a distributed computation system, including multiple levels of computing nodes, wherein each level may have a plurality of computing nodes. Each computing node computes the original data from an upstream node according to the allocated computation tasks and transmits the computed result data to a downstream node.

Typically, the stream computation system outputs result data to the downstream transmission system. Therefore, for the last level of computing nodes in the stream computation system, its downstream node is the transmission system.

Specifically, the present invention provides a high accuracy guarantee to the data computation result in a stream computation mainly through a periodical checkpoint mechanism of the stream computing system, release offset deduplication by the downstream node according to result data, and a "data sequential replay" mechanism for recovered data. According to the solution of the present invention, the user may guarantee the exactly once semantics of the result data, and it is not needed to add an extra complex data replay or check logic at the traffic layer to guarantee no-deduplication and no-loss of the computation data result.

Hereinafter, the present invention will be described in further detail with reference to the accompanying drawings.

FIG. 1 shows an embodiment of the present invention, specifically showing a flow diagram of a fault handling method for a stream computation system.

The fault handling method may be used for any computing node in the stream computation system. Typically, the fault handling method may be used for the last level of computing node in the stream computing system.

As shown in FIG. 1, in step S1, a computing node records arrival sequence of respective original data from a upstream computing node; in step S2, the computing node performs a persistence operation to the received respective original data according to a predetermined period; in step S3, in the case of occurrence of failure and restart, the computing node restores to-be-computed data in internal storage from the original data subjected to persistency operation and/or the upstream computing node according to the recorded arrival sequence, and replays and computes the restored to-be-computed data according to their previous arrival sequence; in step S4, the computing node continues encoding each completely computed result data according to offset of the result data of the previous persistent operation period before the failure.

Specifically, in step S1, the computing node records the arrival sequence of respective original data from the upstream computing node.

Here, in order to implement the "exactly once" semantics, the present invention requires the computing node to record the arrival time of each original data such that when the computing node has a failure and gets restarted, it may be restored and strictly replayed according to the arrival sequence of each original data.

To this end, the present invention defines a new function for the computing node, i.e., recording the arrival sequence of respective original data from the upstream computing node.

Moreover, in order that the computing node can obtain the arrival sequence of respective original data upon fault recovery, the computing node not only locally records the arrival sequences of the respective original data of the upstream computing node, but also synchronously records the arrival sequence of the original data into the external storage system after obtaining the original data from the upstream, e.g., saving them in an external distributed storage system HBase in the checkpoint mechanism so as to avoid loss of part of sequential data.

Afterwards, in step S2, the computing node performs a persistence operation on the received respective original data according to a predetermined period.

Preferably, the computing node's persistence operation on the original data is executed according to a predetermined period through a checkpoint mechanism.

The computing node periodically checkpoints the received respective original data to the external distributed storage system, e.g., HBase, thereby implementing the persistence operation on the original data.

In addition, because these original data are also cached in the internal memory of the computing node for real-time computation such that the checkpoint is only used as a guarantee for fault recovery, when the computing node is restarted in the case of failure, relevant original data may be restored from the original data of checkpoint. This guarantees that the to-be-computed data in the internal memory will not be lost before and after failure of the node, while also significantly reduces a read operation to the HBase and enhances the system's handling efficiency.

Next, in step S3, in the case of occurrence of failure and restart, the computing node restores to-be-computed data in internal storage from the original data subjected to persistency operation and/or the upstream computing node according to the recorded arrival sequence, and replays and computes the restored to-be-computed data according to their previous arrival sequence.

Here, in the present invention, in order to implement "no deduplication, no loss" of the result data, when the computing node fails and gets restarted, the failed node for example resumes the original data of the previous period from the checkpoint point, and compares the arrival sequence of the resumed original data with the sequences recorded by the failed node upon arrival of the respective original data, so as to determine whether lost data still exist; if so, the arrival sequence of the lost data and the upstream computing node where they are from may be determined so as to re-request these lost data from these upstream computing nodes; if not, all computation data in the internal memory may be resumed from the checkpoint. In a more extreme circumstance, it is possible that no computation data of the internal memory before the failure in the original data restored from the checkpoint. That is, the computing node fails immediately after the last checkpoint period, and none of the computing data in the internal memory is subjected to checkpoint. For this case, all lost data in the internal memory may also be obtained through re-requesting from the source upstream computing nodes. Based on the above means, the failed node may restore all computation data in the internal memory before the failure, so as to perform a strict replay and computation on the arrival sequence of these data at the failed node previously; otherwise, the computing data will be messy, incurring data loss or duplication.

Because when a fault occurs, the original data in the internal memory of the computing node are not all unprocessed; instead, some have been processed, while there are still some unprocessed. In order to guarantee the accuracy of data processing, the failed node resumes all original data of the last period from the checkpoint and re-requests other lost data (i.e., the original data having not been subjected to checkpoint yet) from the upstream computing node, and then these restored to-be-computed data (including the original data restored from the checkpoint and the lost data re-requested from the upstream computing nodes) are subjected to strict replay and computation according to their previous arrival sequences, so as to re-obtain corresponding result data. Moreover, the new data will only arrive after these failover data are strictly replayed and computed according to the sequence before the failure, thereby guaranteeing the sequential replay demand of the fault data.

Afterwards, in step S4, the computing node continues encoding each completely computed result data according to offset of the result data of the previous persistent operation period before the fault.

Here, in order to guarantee global uniqueness and coding consistency of each result data, the result data recomputed after the computing node is restarted will be continued to be encoded according to the coding offset progress information of the last checkpoint period. Therefore, in the case of failure and restart, the computing node may restore, from the checkpoint point, the information of offset progress of the result data of the last period. That is, the computing node not only periodically checkpoints the received original data to the Hbase, but also checkpoints the information of offset progress of the result data of the corresponding period.

During the encoding process, in combination with the data strictly replay function, the computing node guarantees that the offset code, i.e., encoding power before and after the fault, carried in each completely computed result data when being transmitted to the downstream node is exactly consistent, which guarantees that the deduplication mechanism of the downstream node is effective.

For example, the computing node determines the coding offset of the first computation completed result data after the restart based on the information of offset progress of the result data of the last persistent operation period (i.e., the last checkpoint period) before the fault.

Here, the next node of the current computing node may be a lower-level computing node of the current computing node. If the current computing node is the last level of computing node of the stream computing system, the result data will be transmitted to the external transmission system.

When the next node receives the result data, the encoding offset of the currently received result data is compared with the encoding offset of the already received result data, so as to deduplicate the result data.

For example, the transmission system uses the offset deduplication mechanism, which guarantees that after restart of the upstream computing node due to fault, the offset information carried in the data released by the upstream computing node is compared with the offset of the received data inside the transmission system, thereby completing the function of filtering and removing duplicate data and implementing the non-repetition feature of releasing the computation result to the transmission system. The function of filtering and removing the duplicate data implements the non-repetition feature of releasing the computation result to the transmission system.

Figure 2:
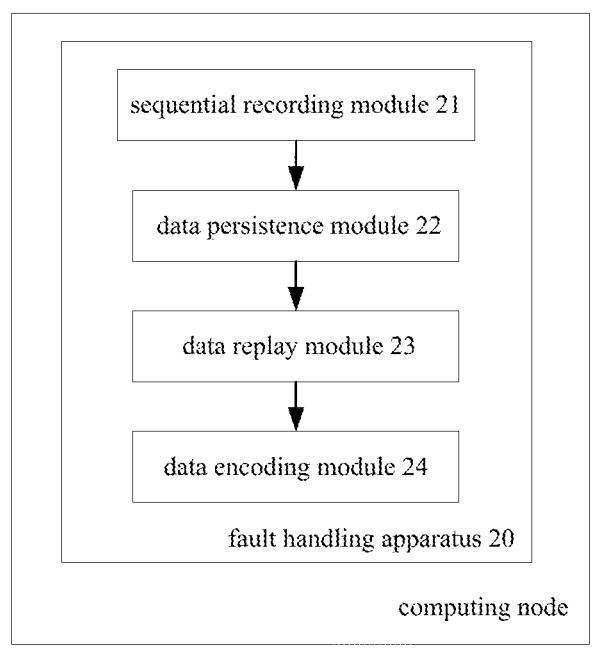
FIG. 2 shows a schematic diagram of a fault handling apparatus for a stream computing system according to an embodiment of the present invention.

FIG. 2 shows an embodiment of the present invention, specifically showing a schematic diagram of a fault handling apparatus for a stream computing system.

The fault handling apparatus may be arranged at any computing node in the stream computing system. Typically, the fault handling apparatus may be arranged at the last level of computing node in the stream computing system.

As shown in FIG. 2, the fault handling apparatus 20 specifically comprises a sequential recording module 21, a data persistence module 22, a data replay module 23, and a data encoding module 24.

Herein, the sequential recording module 21 records arrival sequence of respective original data from a upstream computing node; afterwards, the data persistence module 22 performs a persistence operation to the received respective original data according to a predetermined period; then, in the case of occurrence of failure and restart, the data replay module 23 restores to-be-computed data in internal storage from the original data subjected to persistency operation and/or the upstream computing node according to the recorded arrival sequence, and replays and computes the restored to-be-computed data according to their previous arrival sequence; afterwards, the data encoding module 24 continues encoding each completely computed result data according to offset of the result data of the previous persistent operation period before the fault.

Specifically, the sequential recording module 21 records the arrival sequence of respective original data from the upstream computing node.

Here, in order to implement the "exactly once" semantics, the present invention requires the sequential recording module 21 to record the arrival time of each original data such that when the computing node has a failure and gets restarted, it may be restored and strictly replayed according to the arrival sequence of each original data.

To this end, the present invention defines a new function for the computing node, i.e., recording, by the sequential recording module 21, the arrival sequence of respective original data from the upstream computing node.

Moreover, in order that the computing node can obtain the arrival sequence of respective original data upon fault recovery, the computing node not only locally records the arrival sequences of the respective original data of the upstream computing node, but also synchronously records the arrival sequence of the original data into the external storage system after obtaining the original data from the upstream, e.g., saving them in an external distributed storage system HBase in the checkpoint mechanism so as to avoid loss of part of sequential data.

Afterwards, the data persistence module 22 performs a persistence operation on the received respective original data according to a predetermined period.

Preferably, the data persistence module 22's persistence operation on the original data is executed according to a predetermined period through a checkpoint mechanism.

The data persistence module 22 periodically checkpoints the received respective original data to the external distributed storage system, e.g., HBase, thereby implementing the persistence operation on the original data.

In addition, because these original data are also cached in the internal memory of the computing node for real-time computation such that the checkpoint is only used as a guarantee for fault recovery, when the computing node is restarted in the case of failure, relevant original data may be restored from the original data of checkpoint by the data replay module 23. This guarantees that the to-be-computed data in the internal memory will not be lost before and after failure of the node, while also significantly reduces a read operation to the HBase and enhances the system's handling efficiency.

Next, in the case of occurrence of failure and restart, the data replay module 23 restores to-be-computed data in internal storage from the original data subjected to persistency operation and/or the upstream computing node according to the recorded arrival sequence, and replays and computes the restored to-be-computed data according to their previous arrival sequence.

Here, in the present invention, in order to implement "no deduplication, no loss" of the result data, when the computing node fails and gets restarted, the data replay module 23 for example resumes the original data of the previous period from the checkpoint point, and compares the arrival sequence of the resumed original data with the sequences recorded by the failed node upon arrival of the respective original data, so as to determine whether lost data still exist; if so, the arrival sequence of the lost data and the upstream computing node where they are from may be determined so as to re-request these lost data from these upstream computing nodes; if not, all computation data in the internal memory may be resumed from the checkpoint. In a more extreme circumstance, it is possible that no computation data of the internal memory before the failure in the original data restored from the checkpoint. That is, the computing node fails immediately after the last checkpoint period, and none of the computing data in the internal memory is subjected to checkpoint. For this case, all lost data in the internal memory may also be obtained through re-requesting from the source upstream computing nodes. Based on the above means, the failed node may restore all computation data in the internal memory before the failure, so as to perform a strict replay and computation on the arrival sequence of these data at the failed node previously; otherwise, the computing data will be messy, incurring data loss or duplication.

Because when a fault occurs, the original data in the internal memory of the computing node are not all unprocessed; instead, some have been processed, while there are still some unprocessed. In order to guarantee the accuracy of data processing, the data replay module 23 resumes all original data of the last period from the checkpoint and re-requests other lost data (i.e., the original data having not been subjected to checkpoint yet) from the upstream computing node, and then these restored to-be-computed data (including the original data restored from the checkpoint and the lost data re-requested from the upstream computing nodes) are subjected to strict replay and computation according to their previous arrival sequences, so as to re-obtain corresponding result data. Moreover, the new data will only arrive after these failover data are strictly replayed and computed according to the sequence before the failure, thereby guaranteeing the sequential replay demand of the fault data.

Afterwards, the data encoding module 24 continues encoding each completely computed result data according to offset of the result data of the previous persistent operation period before the fault.

Here, in order to guarantee global uniqueness and coding consistency of each result data, the result data recomputed by the data replay module 23 after the computing node is restarted will be continued to be encoded according to the coding offset progress information of the last checkpoint period. Therefore, in the case of failure and restart, the data encoding module 24 may restore, from the checkpoint point, the information of offset progress of the result data of the last period. That is, the data persistence module 22 not only periodically checkpoints the received original data to the Hbase, but also checkpoints the information of offset progress of the result data of the corresponding period.

During the encoding process, in combination with the data strictly replay function, the data encoding module 24 guarantees that the offset code, i.e., encoding power before and after the fault, carried in each completely computed result data when being transmitted to the downstream node is exactly consistent, which guarantees that the deduplication mechanism of the downstream node is effective.

For example, the data encoding module 24 determines the coding offset of the first computation completed result data after the restart based on the information of offset progress of the result data of the last persistent operation period (i.e., the last checkpoint period) before the fault.

Here, the next node of the current computing node may be a lower-level computing node of the current computing node. If the current computing node is the last level of computing node of the stream computing system, the result data will be transmitted to the external transmission system.

When the next node receives the result data, the encoding offset of the currently received result data is compared with the encoding offset of the already received result data, so as to deduplicate the result data.

For example, the transmission system uses the offset deduplication mechanism, which guarantees that after restart of the upstream computing node due to fault, the offset information carried in the data released by the upstream computing node is compared with the offset of the received data inside the transmission system, thereby completing the function of filtering and removing duplicate data and implementing the non-repetition feature of releasing the computation result to the transmission system. The function of filtering and removing the duplicate data implements the non-repetition feature of releasing the computation result to the transmission system.

It should be noted that the present invention may be implemented in software and/or a combination of software and hardware. For example, each module of the present invention may be implemented by an application-specific integrated circuit (ASIC) or any other similar hardware device. Additionally, some steps or functions of the present invention may be implemented by hardware, for example, a circuit cooperating with the processor so as to implement various steps or functions.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims, instead of the above depiction. Thus, all variations intended to fall into the meaning and scope of equivalent elements of the claims should be covered within the present invention. A plurality of units or modules stated in a system claim may also be implemented by a single unit or module through software or hardware. Terms such as first, second are used for naming, not representing any specific sequences.

The invention claimed is:

1. A method for fault handling in a stream computing system, applied to a computing node, the computing node computes original data streamed from an upstream node to obtain computed result data and transmits the computed result data to a downstream node, the method comprises the following steps:
   in response to respective original data arriving at memory of the computing node, recording an arrival sequence of respective original data originating from an upstream computing node locally at the computing node, and synchronously recording the arrival sequence of the respective original data into an external distributed storage system;
   performing persistence operation on the respective original data and offset progress of result data at intervals of a predetermined persistence operation period, so that to periodically store the respective original data in the memory of the computing node and the offset progress of the result data into the external distributed storage system;

in the case of failure and restart of the computing node, obtaining original data of a last persistence operation period from the external distributed storage system, comparing an arrival sequence of the obtained original data obtained from the external distributed storage system with the arrival sequence of the respective original data synchronously recorded into the external distributed storage system to determine whether there exist lost data in the obtained original data, determining, in response to there exist lost data, an arrival sequence of the lost data, and obtaining the lost data from the upstream computing node where the lost data are originated, so that restoring to-be-computed data in the memory of the computing node from the external distributed storage system and the upstream computing node according to the recorded arrival sequence; and replaying and computing the restored to-be-computed data according to the recorded arrival sequence;

in the case of failure and restart, restoring information of offset progress of result data of the last persistence operation period from the checkpoint point; and continuing encoding each completely computed result data according to offset progress of the result data in the last persistence operation period before the failure, and transmitting the encoded result data to a next node so that the next node utilizes the offset progress of the encoded result data to remove or ignore duplicated information at the next node, comprising:

determining an encoding offset of a first completely computed result data after restart based on information of offset progress in the last persistence operation period before the failure.

2. The method according to claim 1, wherein the persistence operation of the respective original data is executed through a checkpoint mechanism at intervals of the predetermined period.

3. The method according to claim 2, wherein the respective original data are stored in the external distributed storage system through a checkpoint mechanism, thereby implementing a persistence operation.

4. The method according to claim 2, wherein, in the case of failure and restart, first restoring the original data of the last period from the checkpoint point, and comparing the arrival sequence of the obtained original data and the recorded arrival sequence of the respective original data, to determine whether there still exist lost data; if so, obtaining the lost data from the upstream computing node where the lost data are originated, thereby restoring the to-be-computed data in the internal storage before the failure.

5. The method according to claim 1, wherein the next node includes a lower-level computing node of the current computing node or an external transmission system.

6. The method according to claim 1, and further comprising a computing node in the stream computing system, wherein the computing node comprises storage and processor, wherein the storage stores computer program code, wherein when the computer program code is executed by the processor when the is being performed.

7. An apparatus for fault handling in a stream computing system, wherein the apparatus is arranged at a computing node of the stream computing system, the computing node computes original data streamed from an upstream node to obtain computed result data and transmits the computed result data to a downstream node, the apparatus comprises:

at least one processor; and
a memory storing instructions, which when executed by the at least one processor, cause the at least one processor to perform operations, the operations comprising:

in response to respective original data arriving at memory of the computing node, recording an arrival sequence of respective original data originating from an upstream computing node locally at the computing node, and synchronously recording the arrival sequence of the respective original data into an external distributed storage system;

performing persistence operation on the respective original data and offset progress of result data at intervals of a predetermined persistence operation period, so that to periodically store the respective original data in the memory of the computing node and the offset progress of the result data into the external distributed storage system;

in the case of failure and restart of the computing node, obtaining original data of a last persistence operation period from the external distributed storage system, comparing an arrival sequence of the obtained original data obtained from the external distributed storage system with the recorded arrival sequence of the respective original data synchronously recorded into the external distributed storage system to determine whether there exist lost data in the obtained original data, determining, in response to there exist lost data, an arrival sequence of the lost data, and obtaining the lost data from the upstream computing node where the lost data are originated, so that restoring to-be-computed data in the memory of the computing node from the external distributed storage system and the upstream computing node according to the recorded arrival sequence; and replaying and computing the restored to-be-computed data according to the recorded arrival sequence;

in the case of failure and restart, restoring information of offset progress of result data of the last persistence operation period from the checkpoint point; and continuing encoding each completely computed result data according to offset progress of the result data in the last persistence operation period before the failure and transmitting the encoded result data to a next node so that the next node utilizes the offset progress of the encoded result data to remove or ignore duplicated information at the next node, comprising:

determining an encoding offset of a first completely computed result data after restart based on information of offset progress in the last persistence operation period before the failure.

8. The apparatus according to claim 7, wherein the persistence operation of the respective original data is executed through a checkpoint mechanism at intervals of the predetermined period.

9. The apparatus according to claim 8, wherein the respective original data are stored in the external distributed storage system through a checkpoint mechanism, thereby implementing a persistence operation.

10. The apparatus according to claim 8, wherein, in the case of failure and restart, first restoring the original data of the last period from the checkpoint point, and comparing the arrival sequence of the obtained original data and the recorded arrival sequence of the respective original data, to determine whether there still exist lost data; if so, obtaining the lost data from the upstream computing node where the lost data are originated, thereby restoring the to-be-computed data in the internal storage before the failure.

11. The apparatus according to claim 7, wherein the next node includes a lower-level computing node of the current computing node or an external transmission system.

12. A computing node in a stream computing system, wherein the computing node comprises the apparatus for fault handling in a stream computing system according to claim 7.

13. A non-transitory computer storage medium storing a computer program, which when executed by one or more processors, cause the one or more processors to perform operations, the operations comprising:

in response to respective original data arriving at memory of a computing node, recording arrival sequences of respective original data from an upstream computing node locally at the computing node, and synchronously recording the arrival sequence of the respective original data into an external distributed storage system, wherein the computing node computes the respective original data streamed from the upstream node to obtain computed result data and transmits the computed result data to a downstream node;

performing persistence operation on the respective original data and offset progress of result data according to a predetermined persistence operation period, so that to periodically store the respective original data in the memory of the computing node and the offset progress of the result data into the external distributed storage system;

in the case of failure and restart of the computing node, obtaining original data of a last persistence operation period from the external distributed storage system, comparing an arrival sequence of the obtained original data obtained from the external distributed storage system with the recorded arrival sequence of the respective original data synchronously recorded into the external distributed storage system, to determine whether there exist lost data in the obtained original data, determining, in response to there exist lost data, an arrival sequence of the lost data and obtaining the lost data from the upstream computing node where the lost data are originated, so that restoring to-be-computed data in the memory of the computing node from the external distributed storage system and the upstream computing node according to the recorded arrival sequence; and replaying and computing the restored to-be-computed data according to the respective previous arrival sequences;

in the case of failure and restart, restoring information of offset progress of result data of the last persistence operation period from the checkpoint point; and continuing encoding each completely computed result data according to offset progress of the result data in the last persistence operation period before the failure and transmitting the encoded result data to a next node so that the next node utilizes the offset progress of the encoded result data to remove or ignore duplicated information at the next node, comprising:

determining an encoding offset of a first completely computed result data after restart based on information of offset progress in the last persistence operation period before the failure.

* * * * *